(12) United States Patent
Van De Leijgraaf

(10) Patent No.: US 9,113,748 B2
(45) Date of Patent: Aug. 25, 2015

(54) DEVICE FOR PREPARING A HOT BEVERAGE

(75) Inventor: Andreas Raymond Van De Leijgraaf, Heiloo (NL)

(73) Assignee: BRAVILOR HOLDING B.V., Heiloo (NL)

( * ) Notice: Subject to any disclaimer, the term of this patent is extended or adjusted under 35 U.S.C. 154(b) by 27 days.

(21) Appl. No.: 13/414,822

(22) Filed: Mar. 8, 2012

(65) Prior Publication Data

US 2012/0227591 A1 Sep. 13, 2012

(30) Foreign Application Priority Data

Mar. 8, 2011 (NL) ...................................... 2006357

(51) Int. Cl.
*A47J 31/057* (2006.01)
*A47J 31/44* (2006.01)
*A47J 31/00* (2006.01)

(52) U.S. Cl.
CPC ............ *A47J 31/4475* (2013.01); *A47J 31/002* (2013.01); *A47J 31/0573* (2013.01)

(58) Field of Classification Search
CPC .. A47J 31/002; A47J 31/0573; A47J 31/4475
USPC ............ 99/290, 295, 300, 302 R, 293, 323.1, 99/339, 348, 357, 410, 412, 413, 423, 99/484; 392/465; 366/146, 205, 206, 244, 366/249, 251, 272, 273, 274, 276, 282
See application file for complete search history.

(56) References Cited

U.S. PATENT DOCUMENTS 5,367,607 A * 11/1994 Hufnagl et al. ............... 392/465
5,778,765 A 7/1998 Klawuhn et al.
6,279,458 B1 * 8/2001 Sham et al. ...................... 99/281
7,299,955 B2 * 11/2007 Pelkey et al. .............. 222/465.1
8,820,218 B2 * 9/2014 Fischer et al. ............... 99/323.3

FOREIGN PATENT DOCUMENTS

| EP | 0 516 884 | 12/1992 |
| EP | 0 781 520 | 7/1997 |
| EP | 0 843 982 | 5/1998 |
| GB | 1185470 | 3/1970 |
| WO | 2010/059251 | 5/2010 |
| WO | 2010/106348 | 9/2010 |

OTHER PUBLICATIONS

European Search Report dated Oct. 5, 2011, corresponding to the Foreign Priority Application No. 2006357.

* cited by examiner

*Primary Examiner* — Dana Ross
*Assistant Examiner* — Joseph Iskra
(74) *Attorney, Agent, or Firm* — Young & Thompson

(57) ABSTRACT

A device (24) for preparing a hot beverage, especially coffee, includes a water reservoir (4), a heating unit (11) connected to the water reservoir (4), delivery elements (16) connected to the heating unit with a delivery opening (19) for delivering hot water to a container (20) which during use contains an extract from which a beverage is to be made, water transport elements (12, 14) for transporting water from the heating unit (11) to the delivery element (16), and an air supply conduit (27) for supplying air to the hot water. The air supply conduit (27) discharges in or near the delivery element (16), upstream of the container (20), for cooling the water to be delivered by the delivery element (16) to the container (20), wherein the hot water before cooling has a temperature of at least 95° C., preferably at least 97° C., more preferably a temperature around the boiling point.

16 Claims, 1 Drawing Sheet

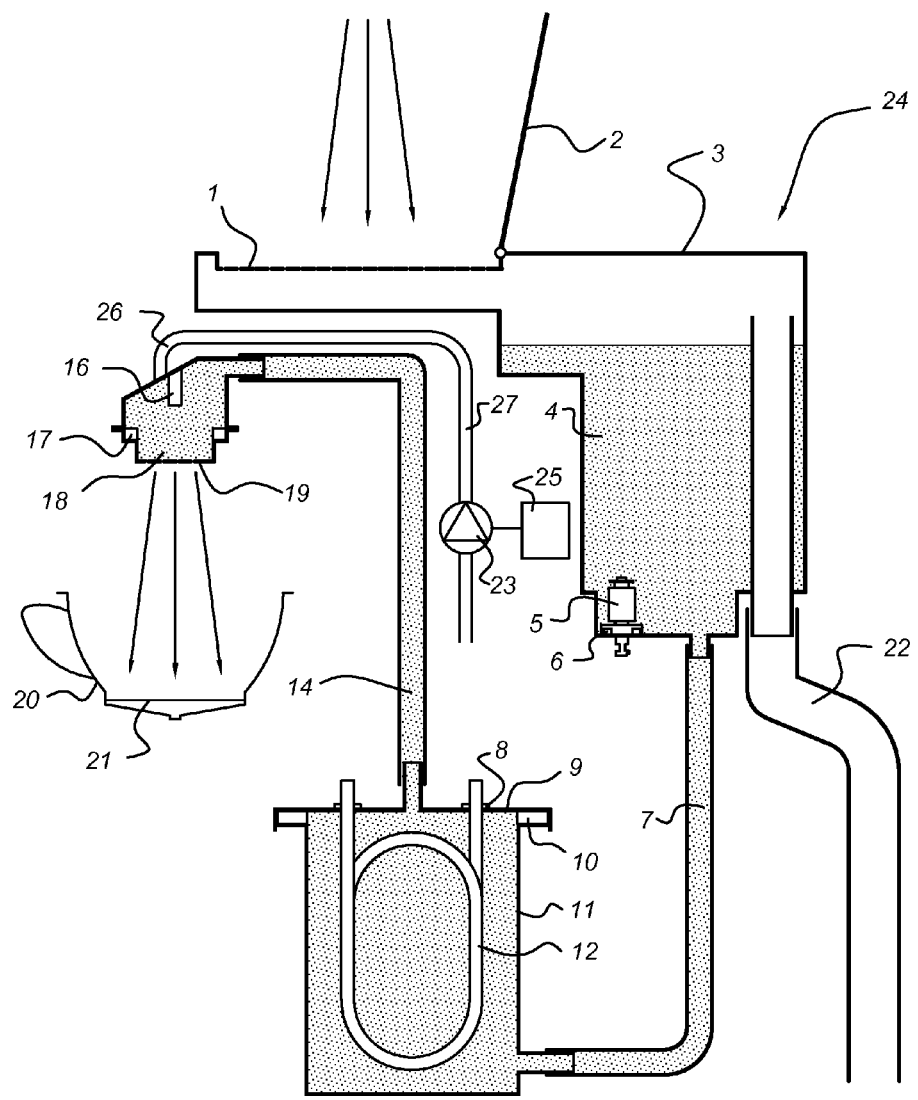

DEVICE FOR PREPARING A HOT BEVERAGE

The invention relates to a device for preparing a hot beverage, especially coffee, comprising:
- a water reservoir,
- a heating unit connected to the water reservoir,
- delivery means connected to the heating unit with a delivery opening for delivering hot water to a container which during use contains an extract from which a beverage is to be made,
- water transport means for transporting water from the heating unit to the delivery means, and
- an air supply conduit for supplying air to the hot water.

BACKGROUND OF THE INVENTION

Such a device for preparing filter coffee is known from for example GB 1.185.470. This patent publication describes such a device with a filter chamber to which hot water from a hot water tank is supplied via a pump. Air is blown in by an air pump near the bottom of the filter chamber to improve the extraction process by agitation.

A disadvantage of such a device is, that the known filter device is not configured for setting the water temperature or the type of beverage, the type of coffee in the filter chamber or a desired temperature of use.

It is therefore an object of the invention to provide a device which allows the water temperature to be adapted easily to the type of beverage during preparation, the type of coffee in the filter chamber or to a desired temperature of use.

SUMMARY OF THE INVENTION

Thereto the device according to the invention is characterized in that the air supply conduit discharges in or near the delivery means, upstream of the container, for cooling the water to be delivered by the delivery means to the container, wherein the hot water before cooling has a temperature of at least 95° C., preferably at least 97° C., more preferably a temperature around the boiling point.

Because the air supply conduit discharges in or near the delivery means the degree of cooling of the hot water can be influenced there by blowing in air, before the water enters the container, and particularly, before the water reaches the extract in the container. It is important that the hot water has such a high temperature, that the hot water has a strong tendency to vaporize. By supplying air in or near the delivery means the vaporization process of the hot water is accelerated. During this vaporization process heat is extracted from the hot water itself, as a result of which the water cools down. In this way the water temperature can be adapted relatively easily to the type of beverage during preparation, the type of coffee in the filter chamber or to a desired use temperature. Preferably, the hot water is cooled before being discharged from the delivery means. Furthermore, in order to prevent unwanted additional cooling, the delivery means can be arranged to discharge directly onto the extract in the container.

The delivery means can be advantageously arranged outside the container containing the extract, for improving access to the inside of the container, for example for removing used-up extract. Preferably, the container containing the extract from which a beverage is to be made is detached from the delivery means to allow removal of the container away from the delivery means.

Therein it is advantageous that the temperature of the hot water at the delivery opening decreases at least with 1° C., preferably with at least 2° C., more preferably with at least 5° C.

In an embodiment of a device according to the invention the water transport means comprise the heating unit and a discharge conduit connected to the heating unit and the delivery means, wherein the heating device and the discharge conduit are arranged to transport heated water through the discharge conduit to the container under the influence of temperature.

Due to the application of a natural water flow as a consequence of heating the water in the heating unit, and by dimensioning the discharge conduit, the water can be pumped towards the delivery means without using a mechanical pump. As a rule the water is heated to a temperature, for example near net boiling point, wherein the water has a strong tendency towards vaporizing. As a result so-called 'vapour bubbles' are formed, that bring about the natural water flow towards the delivery means. This embodiment is therefore very suitable for application in the device according to the invention, because the device according to the invention requires a water temperature in or near the delivery means, that is so high, that the water shows a strong tendency towards vaporizing.

The water can also be transported directly to a receptacle such as a cup, mug or jug of a user in which by the user himself or by automatic supply, an instant beverage or a tea pad is placed, wherein the temperature of the water is adjusted to the desired consumption value via the air cooling.

The container can for that matter comprise a filter unit with ground coffee, a container with coffee in the shape of a "pad" or mixing chamber to which an instant-beverage such as soup or chocolate is added.

The air cooling can occur in the vicinity of the delivery means, but occurs preferably in that the air supply conduit discharges in the delivery means, upstream of the delivery opening.

In a further embodiment of a device according to the invention the water in the heating device is heated close to, or to, the boiling point to form vapour bubbles and the diameter of the discharge conduit is between 10 mm and 15 mm, such that vapour bubbles in the discharge conduit transport water to the delivery means. Due to the 'vapour bubble pump' effective pump action can be obtained.

In a preferred embodiment the cooling is brought about by an air pump, that is arranged for supplying ambient air during use. Since ambient air under normal conditions is in ample supply in the vicinity of the device, it is advantageous to use an air pump to mix ambient air with the heated water in the delivery unit.

In a further embodiment the air pump is connected to a control unit. With this control unit the flow of the air pump can be adjusted by the manufacturer during production of the device, or by a user via a control panel during operation of the device.

In a yet further embodiment the air pump is adjusted in such a way by means of the control unit, that the flow is approximately 1-3 l/min. Such an air flow causes sufficient cooling action to be generated by the air supplied to the discharge unit.

DETAILED DESCRIPTION

An exemplary embodiment of a device according to the invention will be elucidated further by means of example with reference to accompanying FIG. 1. FIG. 1 shows a schematic cross-section in side view of a device according to the invention.

FIG. 1 shows a device 24 for producing hot water, especially for producing filter coffee, provided with a housing 3, in which a cold water reservoir 4 is provided. The cold water reservoir 4 is connected to a heating unit 11 by means of a cold water conduit 7. The heating unit 11 is connected to a spray head 16 via a hot water conduit 14, for delivering hot water from the heating unit 11. FIG. 1 furthermore shows an air inlet 26 mounted near the spray head 16.

The device 24 is provided with a cover 2 at an upper side. The cover 2 can be moved between an open and a closed position. In the open position water can be supplied to the device 24. The device 24 is furthermore provided with a sieve 1 to purify the supplied water. Usually the cover 2 is in the closed position during use. Also the device 24 can be connected for example to a cold water conduit to supply water.

The supplied water subsequently flows into a cold water reservoir 4. The cold water reservoir 4 is provided with an overflow conduit 22. The overflow conduit 22 causes excess water in the cold water reservoir 4 to be drained off. Furthermore the cold water reservoir 4 is provided with a float mount 6, in which a float switch 5 is fitted. The float switch 5 brings about that it is prevented that the cold water reservoir 4 will run dry. Thereto the float switch 5 can for example be connected to a mechanism that automatically supplies water if the water level gets below a certain value. The float switch 5 can also be connected to a device that sends a signal to the user to prompt the user to replenish the cold water reservoir 4. The float switch 5 can also be connected to an interruption circuit that turns the device off in case of it running dry. In FIG. 1 the float switch 5 is mounted near a bottom of the cold water reservoir 4.

At the bottom of the cold water reservoir 4 a cold water conduit 7 is fitted. The cold water conduit 7 is connected to a heating unit 11. The heating unit 11 is positioned below the cold water reservoir 4. Due to this position below the cold water reservoir 4 water from the cold water reservoir 4 descends into the heating unit 11 by means of gravity. The heating unit 11 is sealed by a permanently attached cover or a detachable cover element 9 that can be removed, for example for maintenance or cleaning. To obtain a good seal between the cover element 9 and the heating unit 11 use is made of a seal 10. The seal 10 can for example comprise a seal out of plastic, such as rubber, more specifically a rubber sealing ring, that extends along the circumference of the heating unit 11.

The heating unit 11 is provided at the upper side with two element mounts 8. In the element mounts 8 a heating element 12 is suspended. The heating element 12 consists of a spiral-shaped heating part that is distributed evenly over the available space to obtain even heating of the water in the heating unit 11. The water from the cold water reservoir 4 therein is heated to such a temperature, for example 100° C., that vapour bubbles are formed that are transported through the hot water conduit 14 to a spray head 16.

Via the spray head 16 the heated water can leave the device 24. The water then enters a filter unit, comprising a filter pan, 20. The filter unit 20 is arranged for containing coffee extract. The spray head 16 is situated outside of the filter unit 20 allowing removal of the filter unit 20 from under the spray head 16. The filter unit 20 furthermore comprises a spring 21. The spring 21 brings about even support of the filter paper, as a result of which blockages are prevented.

The spray head 16 comprises an air inlet 26, that is connected to an air supply conduit 27. The air supply conduit 27 is connected to an air pump 23. The air pump 23 is connected to a control unit 25 for controlling the air flow of the air pump 23. The air pump 23 is preferably adjusted by means of the control unit 25 in such a way that the flow is approximately 1-3 l/min. The control unit can be adjusted by the manufacturer or can be provided with input keys or buttons in order to have the air flow set by a user.

The spray head 16 is furthermore provided with a spray tray 18. The spray tray 18 is detachably connected to the further part of the spray head 16. The spray tray 18 can for example be provided with a screw thread to be detachable, wherein the further part of the spray head 16 comprises a further screw thread matching this screw thread. A seal 17 is provided for obtaining a fluid- and gastight connection between the spray tray 18 and the further part of the spray head during use. This seal 17 comprises by way of example a plastic sealing ring.

The spray tray 18 is provided with an outlet 19 with recesses, for example holes, especially holes that during use cause diverging water jets in order to obtain a good distribution of water over the coffee-extract. Thus, the water is cooled before reaching the extract in the container 20.

In the exemplary embodiment as described above a temperature drop of 3-7° C. can be obtained with respect to the boiling temperature at a water flow of approximately 0.3 l/min. The device according to the invention can also be used at higher water flows such as 0.2 l/min to over 2 l/min.

REFERENCE NUMERALS

1. Sieve
2. Cover
3. Housing
4. Cold water reservoir
5. Float switch
6. Float mount
7. Cold water conduit
8. Element mount
9. Cover element
10. Seal
11. Heating unit
12. Heating element
13. -
14. Hot water conduit
15. -
16. Spray head
17. Seal
18. Spray tray
19. Outlet
20. Filter unit
21. Spring
22. Overflow conduit
23. Air pump
24. Device
25. Control unit
26. Air inlet
27. Air supply conduit

The invention claimed is:
1. A device (24) for preparing a hot beverage, comprising:
a water reservoir (4);
a heating unit (11) connected to the water reservoir (4), the heating unit (11) comprising a heating device (12);
delivery means (16) connected to the heating unit with a delivery opening (19) for delivering hot water to a container (20) which during use contains an extract from which a beverage is to be made, the heating unit (11) being situated at a lower position than the delivery opening (19);

water transport means (12, 14) for transporting water from the heating unit (11) to the delivery means (16), the water transport means comprising a discharge conduit (14) connected to the heating unit (11) and the delivery means (16), and the heating device (12) and the discharge conduit (14) configured to transport heated water through the discharge conduit (14) to the container (20) where the heated water, in use, is heated in the heating unit (11) to the boiling point to form vapor bubbles so that the vapor bubbles enter the discharge conduit (14) and transport the heated water to the delivery means (16); and an air supply conduit (27), for supplying air to the hot water, comprising an air pump (23) connected to a control unit (25) for controlling air flow, wherein the air supply conduit (27) discharges in the delivery means (16), in or near the delivery opening of the delivery means (16), and upstream of the container (20), such that the delivery means (16) discharge only an air/water-mixture from the delivery opening, wherein the container (20) for containing the extract from which a beverage is to be made is detached from the delivery means (16), wherein the delivery means (16) are arranged to discharge directly onto the extract in the container (20), wherein the hot water is cooled before being discharged from the delivery means (16), and a degree of cooling of the hot water is caused within the delivery means by air entering through the air supply conduit in or near the delivery opening before the water enters the container and before the water reaches the extract in the container, wherein the hot water before the cooling has a temperature of at least 95° C., wherein the air pump (23) is adjustable, via the control unit (25), so that, due to the air flow, the temperature of the hot water at the delivery opening (19) decreases by at least 1° C., and wherein the air flow of the air pump is adjustable by the manufacturer during production of the device or by a user via a control panel during operation of the device, so that the air flow and correspondingly the water temperature is adaptable to the type of beverage during preparation.

2. The device (24) according to claim 1, wherein the air supply conduit (27) discharges in the delivery means (16), upstream of the delivery opening (19).

3. The device (24) according to claim 1, wherein the diameter of the discharge conduit (14) is between 10 mm and 15 mm.

4. The device (24) according to claim 2, wherein the diameter of the discharge conduit (14) is between 10 mm and 15 mm.

5. The device (24) according to claim 1, wherein the hot water before cooling has a temperature of at least 97° C.

6. The device (24) according to claim 1, wherein the hot water before cooling has a temperature around the boiling point.

7. The device (24) according to claim 1, wherein the hot water at the delivery opening (19) decreases by at least 2° C.

8. The device (24) according to claim 1, wherein the hot water at the delivery opening (19) decreases by at least 5° C.

9. The device (24) according to claim 5,
wherein the air supply conduit (27) comprises an air pump (23) connected to a control unit (25) for controlling an air flow, and
wherein the air pump (23) is adjusted in such a way via the control unit (25) that due to the air flow the temperature of the hot water at the delivery opening (19) decreases by at least 1° C.

10. The device (24) according to claim 6,
wherein the air supply conduit (27) comprises an air pump (23) connected to a control unit (25) for controlling an air flow, and
wherein the air pump (23) is adjusted in such a way via the control unit (25) that due to the air flow the temperature of the hot water at the delivery opening (19) decreases by at least 1° C.

11. The device (24) according to claim 9, wherein the hot water at the delivery opening (19) decreases by at least 2° C.

12. The device (24) according to claim 9, wherein the hot water at the delivery opening (19) decreases by at least 5° C.

13. A device (24) for preparing a hot beverage, comprising:
a water reservoir (4);
a heating unit (11) connected to the water reservoir (4), the heating unit (11) comprising a heating device (12);
a water delivery apparatus (16) that encloses a chamber, the chamber having a water inlet and an air inlet, the water delivery apparatus (16) comprising a spray tray (18) that forms a wall of the chamber and has an outlet (19) in fluid communication with the chamber,
the outlet (19) of the spray tray (18) being provided in a location to, in use, deliver water from the chamber to a container (20) for containing an extract from which a beverage is to be made, and
the outlet (19) being situated at a position that is higher than the heating unit (11);
a water discharge conduit (14) that connects the heating unit (11) and water inlet of the water delivery apparatus (16), and
the heating device (12) and the water discharge conduit (14) configured to cooperate for transporting water through the water discharge conduit (14) to the water delivery apparatus (16), the water, in use, being heated in the heating unit (11) to the boiling point to form vapor bubbles so that the vapor bubbles enter the water discharge conduit (14) and transport the heated water to the water delivery apparatus (16); and
an air supply conduit (27) for supplying air to the chamber of the water delivery apparatus (16) via the air inlet such that, in use, air supplied by the air supply conduit (27) cools the heated water received in the chamber of the water delivery apparatus (16) via the water discharge conduit (14), said air supply conduit comprising an air pump (23) connected to a control unit (25) for controlling air flow,
wherein the air inlet of the water delivery apparatus (16) is located upstream of the outlet (19) of the spray tray (18) such that the water delivery apparatus (16) discharges an air/water-mixture through the outlet (19), and a degree of cooling of the heated water within the chamber is caused by the air supplied by the air supply conduit (27),
wherein the hot water before the cooling has a temperature of at least 95° C.,
wherein the air pump (23) is adjustable, via the control unit (25), so that, due to the air flow, the temperature of the hot water at the delivery opening (19) decreases by at least 1° C., and wherein the air flow of the air pump is adjustable by the manufacturer during production of the device or by a user via a control panel during operation of the device, so that the air flow and correspondingly the water temperature is adaptable to the type of beverage during preparation.

14. The device (24) according to claim 13, wherein the outlet (19) of the spray tray (18) comprises holes that, in use, cause the heated water to exit the chamber in the form of diverging water jets.

15. The device (24) according to claim 13, wherein the spray tray (18) is removeably connected to the water delivery apparatus (16).

16. The device (24) according to claim 15, wherein an interface between the spray tray (18) and the water delivery apparatus (16) includes a seal (17) that provides a gas-tight connection between the spray tray (18) and the water delivery apparatus (16).

* * * * *